United States Patent Office 2,909,413
Patented Oct. 20, 1959

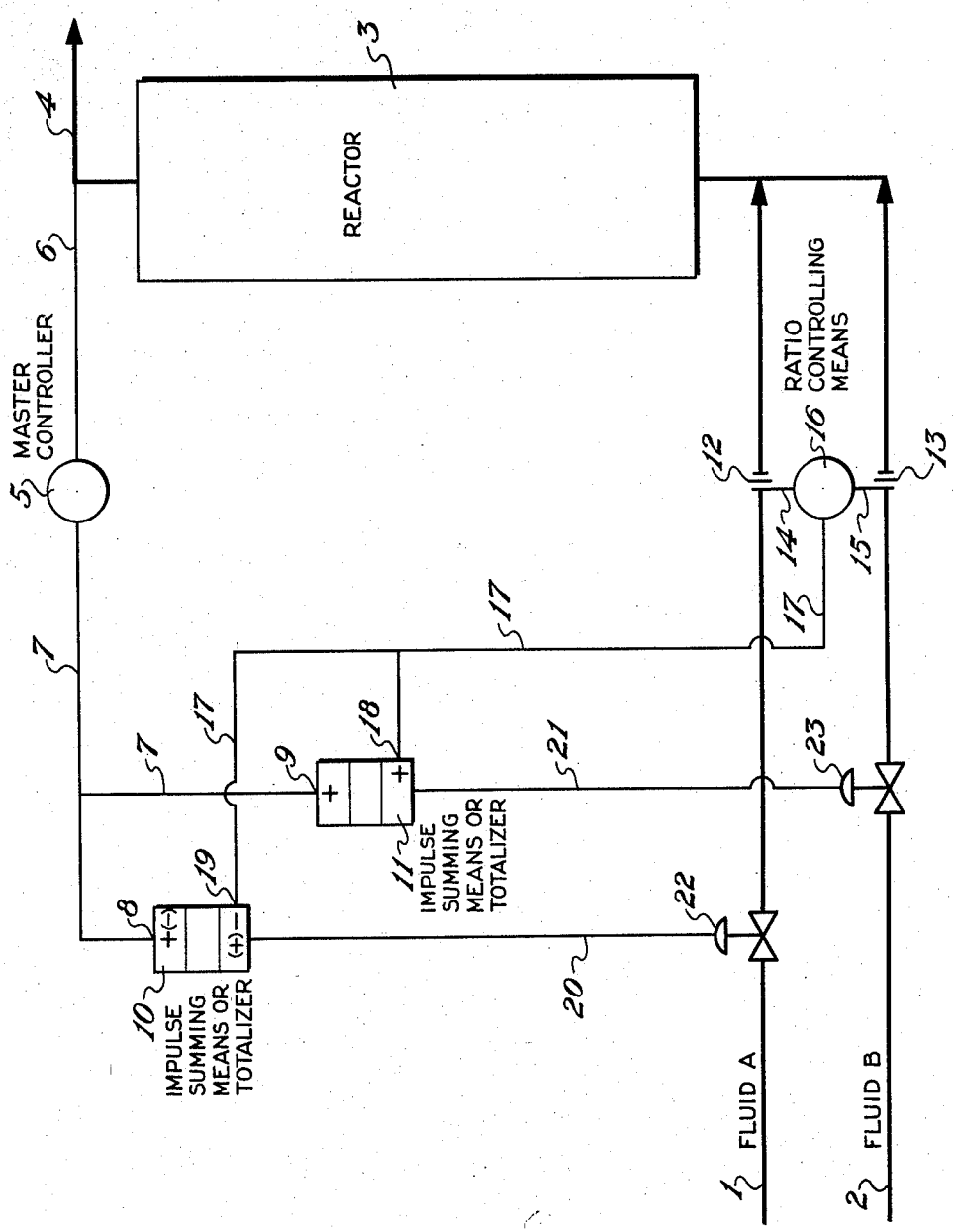

2,909,413

METHOD FOR REGULATING THE FLOW OF FLUIDS TO REACTORS

Joseph M. Hildyard, Youngstown, N.Y., assignor to Hooker Chemical Corporation, a corporation of New York Application August 31, 1956, Serial No. 607,442

4 Claims. (Cl. 23—230)

The present invention relates to a system for regulating the flow of fluids to reactors. More particularly, this invention relates to a system for accurately regulating the ratio of fluids being fed to a reactor whereby high purity products can be produced with maximum uniformity and minimum danger.

In the prior art methods of regulating fluid flows to the reactor there are many operating difficulties. For example, owing to the time lag provided by a master controller and the follow-up action of slave and drive components it is often difficult to obtain a stabilized process and achieve minimum deviation of the products from the desired results. In order to further illustrate the problem of obtaining a stabilized process the operating difficulties encountered in the combustion of hydrogen chloride by prior art methods will be discussed. If the master controller which in this case is a pressure controller, controls the pressure of the effluent gas leaving the combustion chamber and the effluent pressure is off regulation, the pressure controller must initiate action whereby the hydrogen control valve is changed to supply more or less hydrogen. This change in hydrogen feed rate then causes a change in the ratio of the hydrogen to chlorine, thereby requiring that the chlorine feed rate be altered so that the desired ratio may be obtained. Owing to the comparatively long time between the initial regulating actuation and the achievement of the correct hydrogen ratio, combined with the effect of the increment chlorine supply upon the pressure and the master controller a condition of instability may arise whereby the hydrogen supply continuously oscillates about a mean value. Due to the lag of the chlorine supply behind the hydrogen supply a condition of over and under regulation will exist. Therefore in practice the hydrogen gas is maintained in considerable excess in order to insure complete combustion of the chlorine gas.

The object of my invention is to provide a system for regulating the ratio of fluid flows to reactors to a fine degree to produce a high purity product under more favorable economic conditions. Other objects will become apparent to those skilled in the art on further consideration of the complete specification and claims.

I have now found an improvement in a system for regulating the flow of fluids including a reactor and a master controller deriving an impulse from an external variable which comprises: applying the control impulse of said master controller to similar or opposite sensing inputs of two impulse summing means; applying the control impulse of a ratio controlling means to opposite or similar sensing inputs of said two impulse summing means; said ratio controller deriving an impulse from flow elements in each fluid feed line; applying the output control impulse of said two impulse summing means to control valves located in each fluid feed line to said reactor to effect the desired action in said valves.

In order that this invention may be more easily understood it will be described with reference to the attached drawing which illustrates a simplified diagrammatic flow sheet of one embodiment embraced within the scope of this invention.

Referring to the figure: Fluid A (1) and fluid B (2) are fed into a reactor 3 and the resultant product so formed is withdrawn from the reactor by way of exit line 4. A master controller 5 receives an input impulse 6 from the exit line 4. The output of the master controller is transmitted to two similar (or opposing) sensing inputs 8 and 9 of two impulse summing means or totalizers 10 and 11. Orifices 12 and 13 provide equal pressure drops in the fluid feed line for conditions of correct ratio. The pressure in fluid A feed line and the fluid B feed line are applied (14 and 15) to a ratio controlling means 16. The output of this ratio controlling means is applied (17) to two opposing (or similar) inputs 18 and 19 of said two impulse summing means 11 and 10. The resultant output of the two impulse summing means or totalizers is then applied (20 and 21) to two control valves 22 and 23 which control the feed rate in fluid A and fluid B feed lines respectively, by effecting the correct action in said valves.

The choice of input (like or opposite) of the master controller and ratio controller with respect to the impulse summing means is determined by desired effect upon the two feed valves and whether the two valves are both of the same action or of opposite action (that is both normally open, both normally closed or one of each action).

The following example is for the purpose of further illustrating the present invention relating to a system for regulating the flow of fluids to reactors and illustrates the combustion of hydrogen and chlorine to form hydrogen chloride. It is to be understood that the specific details given in the example have been chosen for the purpose of illustration and are not intended to limit the invention except as defined in the appended claims.

EXAMPLE 1

Hydrogen 1 and chlorine 2 maintained at 4 p.s.i.g. were fed through normally closed control feed valves 22 and 23 to the combustion chamber 3. The pressure of the combustion chamber effluent gas 4, hydrogen chloride, was transmitted to a pressure controller 5 between 3 and 15 p.s.i.g. inclusive). The output of the pressure controller 7 was applied to two similar sensing inputs 8 and 9 of two pressure impulse summing means 10 and 11. A differential pressure controller 16 having an output of between 3 and 15 p.s.i.g., measured (14 and 15) the difference in the upstream pressure of the fluid feeds. The output of the differential pressure controller was applied (17) to two opposite sensing inputs 18 and 19 of the two pressure impulse summing means 10 and 11. As the manufacture of hydrogen chloride by the combustion of hydrogen and chlorine requires one mole of each gas, the desired ratio was 1 to 1. Orifices were designed for the hydrogen and chlorine feed lines so that when a 1 to 1 ratio existed, equal pressures were realized at the upstream taps of these orifices. A manual bypass valve was placed around the hydrogen orifice to provide a means of giving a final adjustment to the ratio of the two gases. The output of the pressure controller and the differential pressure controller were 3 to 15 p.s.i.g.

The set points of the impulse summing means were 9 p.s.i.g., that is 9 p.s.i.g. was applied to a plus bellows of the first instrument 10 and the minus bellows of the second giving in effect a +9 and −9 set point. With zero differential between the two orifices and balanced (or equivalent) valves, the output of the differential controller would be 9 p.s.i.g. applied to the minus bellows of the first summing means 10 and the plus bellows of the second summing means 11. With this condition the output of the master controller would be repeated thru the summing means and applied to the control valves. If the control valves are not balanced (or equivalent) a different output would be required of the differential controller to provide zero differential at the orifices. For example, a typical value for the differential controller output might be 10 p.s.i.g., thus in effect subtracting 1 p.s.i. from the master controller in the first summing means, and adding 1 p.s.i. to the master controller in the second summing means to cause the first valve 22 to close more and the second valve 23 to open more to provide the required zero differential between the two orifices.

The function of the summing means can be expressed mathematically as follows:

Let A be the output of the master controller.
Let B be the output of the differential controller.
Let C be the set point of the totalizer.
Let D be the output of the totalizer.

For the first totalizer with the plus set point the output $D=A-B+C$.
For the second totalizer with the minus set point the output $D=A+B-C$.

The example above is illustrated by No. 3 of the following table together with other variations in feed ratios and master controller settings. When the feed ratio is "under regulation" (differential pressure controller 7 p.s.i.g.), the pressure controller output may be 12 p.s.i.g. and the pressure impulse summing means set point is 9 (see #4), the resultant output of the two impulse summing means to the hydrogen and chlorine control valves is 10 and 14 p.s.i.g. respectively.

Table

| Number | Feed Ratio | A* | B* | C* | Impulse Summing Means Output | |
|---|---|---|---|---|---|---|
| | | | | | Minus Set Point $D=A+B+(-)C$ | Plus Set Point $D=A-B+C$ |
| | | | | | P.s.i.g. | P.s.i.g. |
| 1 | 1:1 | 3 | 9 | 9 | 3 | 3 |
| 2 | 1:1 | 12 | 9 | 9 | 12 | 12 |
| 3 | Over Regulation. | 12 | 10 | 9 | 13 | 11 |
| 4 | Under Regulation. | 12 | 7 | 9 | 10 | 14 |

*B = Differential Pressure Controller Output (p.s.i.g.).
*A = Pressure Controller Output (p.s.i.g.).
*C = Impulse Summing Means Set Point (p.s.i.g.).
D = Impulse Summing Means Output (p.s.i.g.).

The master controller may consist of any process controller such as a pressure controller, flow controller, pH controller etc., wherein changes in a process variable may be encountered, for example, pH control of bleach manufacture. The controller is connected so that it derives an input impulse from the external line of a reactor, then the control impulse of the master controller is applied to similar or opposite sensing inputs of two impulse summing means or totalizers.

The ratio controlling means, such as a differential pressure controller, is connected so that its two input impulses are derived from flow elements, such as orifices or rotameters, located in each fluid feed line. The control impulse is applied to two opposite or similar sensing inputs of two impulse summing means or totalizers. Although only one ratio controlling means has been illustrated it is possible to employ additional controllers, for example, hydrogen and chlorine may be proportioned to produce hydrogen chloride and in turn proportioned with acetylene to produce vinyl chloride. Also, although the example given uses a single differential pressure controller between the extreme tops of the two orifices and uses a zero differential set point to achieve a ratio, it is also possible to use two differential pressure devices connecting one across each orifice in a conventional manner and apply their outputs (mechanical or otherwise) to a conventional ratio controller whose output is applied to the desired summing means. The advantage of the method used in the example is that a narrow range instrument, for instance one measuring a range between plus one and minus one inch of water can be used to accurately measure the differences in upstream pressures of two orifices operating at much higher differentials, for instance 100 inches of water full flow differential. This arrangement permits more accurate proportioning at low flows than would be possible with the conventional ratio device.

The impulse summing means or totalizer is any mechanical (pneumatic) or electric (vacuum tube) means for receiving similar (plus, plus) or opposite (minus, plus) inputs and then summing the results of these various inputs and applying the summed result to control valves in the feed lines.

In order to further illustrate the operation of an impulse summing means a particular arrangement shall be described. When the master controller is a pressure controller having a pneumatic output a change in the pressure of the effluent gas leaving a combustion chamber will cause the pressure controller to transmit a pneumatic pressure to similar sensing bellows of two pressure impulse summing means. At the same time a change in the ratio of the two fluid feeds will be determined by a differential pressure controller also with a pneumatic output which causes the controller to transmit second pneumatic pressure to opposing sensing bellows of the same two pressure impulse summing means. In turn the pressure impulse summing means will sum these inputs and the summed result will be employed to actuate the two control valves in the same direction (opening or closing both valves) to restore the process to the desired value. If the output of the master controller is transmitted to opposite sensing inputs of the impulse summing means, then the resultant output would actuate two opposite acting control valves in the same direction (opening or closing both valves) to restore the process to the desired value. The inputs may be either pressure or electrical impulses depending upon the summing means. Equipment commonly called totalizers or computing relays, such as the Taylor Transet Computing Relay 348R, may be employed as the impulse summing means.

This automatic control system is of advantage in regulating combustion control in which the ratio of the fuel gas and combustion gas must be regulated to a fine degree to produce a high purity combustion product (less than 2% impurity). It is of particular value in that, in the event of a load change the fuel gas and the combustion gas are changed simultaneously rather than in having one gas flow lead the other as in prior art combustion control systems. A further advantage of this arrangement is that in the event the ratios are not correct, one valve is opened while the other valve is closed. This minimizes changes in gas inventory feed to the reactor over the inventory change that would occur if one valve were actuated by its master controller and the other valves were ratioed thereto. Thus the effect of inventory changes are minimized on the input of master controller and inter-action between said master controller and the ratio controller is also minimized. This method is of particular advantage when the ratio of fluid feeds is 1 to 1.

It is to be understood that the above described arrangements are simply illustrative of the application of the principles of this invention. Numerous other arrangements may be readily devised by those skilled in the art which will employ the principles of this invention and fall within the spirit and scope thereof, for example, the controlled reaction of chlorine with methanol, chlorine with carbon monoxide, hydrogen chloride with acetylene, lime slurry (liquid) with chlorine (gas) and hydrogen sulfide with oxygen to form sulfur dioxide. It is anticipated that my system may be used where the products of one reaction are passed immediately to a second reactor wherein the initial reactants are proportioned with other reactants to produce a controlled two-step process. Illustrations of such a reaction are combustion of chlorine with hydrogen and reaction of the resultant hydrogen chloride with acetylene and reaction of lime slurry with chlorine and the controlled dilution of the resultant bleach with water.

I claim:

1. In a method for regulating the flow of fluids including a reactor and a master controller which derives an impulse from an external variable, the improvement which comprises: applying the control impulse of said master controller to similar sensing inputs of two impulse summing means; applying a control impulse which is derived from a ratio controlling means to two opposite sensing inputs of said two impulse summing means; said ratio controlling means deriving an impulse from flow elements located in each fluid feed line; applying the control impulse of said two impulse summing means to control valves located in each fluid feed line to said reactor to effect like action in said valves.

2. In a method for regulating the flow of fluids including a reactor and a master controller which derives an impulse from an external variable, the improvement which comprises: applying the control impulse of said master controller to opposite sensing inputs of two impulse summing means; applying a control impulse which is derived from a ratio controlling means to two similar sensing inputs of said two impulse summing means; said ratio controlling means deriving an impulse from flow elements located in each fluid feed line; applying the control impulse of said two impulse summing means to control valves located in each fluid feed line to said reactor to effect opposite action in said valves.

3. The method of claim 1 wherein the fluids are gases.

4. The method of claim 1 wherein the feed fluids are hydrogen gas and chlorine gas and the reactor product is hydrogen chloride gas.

References Cited in the file of this patent

UNITED STATES PATENTS

| | | |
|---|---|---|
| 1,772,920 | Smoot | Aug. 12, 1930 |
| 2,064,864 | Temple | Dec. 22, 1936 |
| 2,262,573 | Bender | Nov. 11, 1941 |
| 2,285,540 | Stein | June 9, 1942 |
| 2,659,531 | Thoresen | Nov. 17, 1953 |
| 2,707,964 | Monroe | May 10, 1955 |